United States Patent
Ji et al.

(10) Patent No.: US 10,142,968 B2
(45) Date of Patent: *Nov. 27, 2018

(54) CONTROL CHANNEL DETECTION METHOD AND APPARATUS OF MIMO SYSTEM

(71) Applicant: Samsung Electronics Co., Ltd., Suwon-si, Gyeonggi-do (KR)

(72) Inventors: Hyoungju Ji, Seoul (KR); Younsun Kim, Seongnam-si (KR); Juho Lee, Suwon-si (KR); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,200

(22) Filed: Sep. 25, 2015

(65) Prior Publication Data

US 2016/0014762 A1  Jan. 14, 2016

Related U.S. Application Data

(63) Continuation of application No. 13/669,945, filed on Nov. 6, 2012, now abandoned.

(30) Foreign Application Priority Data

Nov. 7, 2011 (KR) ........................ 10-2011-0115276

(51) Int. Cl.
*H04W 72/04* (2009.01)
*H04L 5/00* (2006.01)

(52) U.S. Cl.
CPC ....... *H04W 72/0406* (2013.01); *H04L 5/0053* (2013.01); *H04L 5/0094* (2013.01); *H04L 5/0023* (2013.01)

(58) Field of Classification Search
CPC ............ H04W 72/0406; H04L 5/0053; H04L 5/0094; H04L 5/0023
See application file for complete search history.

(56) References Cited

U.S. PATENT DOCUMENTS 8,755,452 B2   6/2014  Levy
2005/0120097 A1  6/2005  Walton et al.
(Continued)

FOREIGN PATENT DOCUMENTS

EP       2773054 A1       9/2014
KR   10-2005-0058030 A    6/2005
(Continued)

OTHER PUBLICATIONS

3rd Generation Partnership Project; Technical Specification Group Radio Access Network; Evolved Universal Terrestrial Radio Access (E-UTRA); Physical layer procedures (Release 10), Sep. 2009, 3GPP TS 36.213 V10.3.0.*

(Continued)

*Primary Examiner* — Shailendra Kumar
(74) *Attorney, Agent, or Firm* — Jefferson IP Law, LLP

(57) ABSTRACT

A control channel transmission/reception method and apparatus are provided. The control channel transmission method of a base station includes acquiring a criterion for sorting control channels, sorting the controls channels into at least two control channel sets based on the criterion, configuring the control channels by allocating at least one antenna port to each control channel set, and transmitting the control channels as configured.

16 Claims, 10 Drawing Sheets

(56) References Cited

U.S. PATENT DOCUMENTS

| | | |
|---|---|---|
| 2005/0128965 A1 | 6/2005 | Seo et al. |
| 2009/0170495 A1 | 7/2009 | Blum et al. |
| 2010/0113078 A1 | 5/2010 | Farajidana et al. |
| 2011/0090825 A1 | 4/2011 | Papasakellariou et al. |
| 2011/0141926 A1 | 6/2011 | Damnjanovic et al. |
| 2011/0206147 A1* | 8/2011 | Hariharan ............ H04L 1/08 375/260 |
| 2011/0211546 A1 | 9/2011 | Hooli et al. |
| 2012/0120842 A1 | 5/2012 | Kim et al. |
| 2013/0044727 A1* | 2/2013 | Nory .................. H04L 5/0092 370/330 |
| 2013/0070724 A1 | 3/2013 | Malladi |
| 2013/0083769 A1 | 4/2013 | Qu et al. |
| 2013/0100905 A1 | 4/2013 | Pan et al. |
| 2013/0107839 A1 | 5/2013 | Seki |
| 2013/0114521 A1* | 5/2013 | Frenne .............. H04L 5/0053 370/329 |
| 2013/0114522 A1* | 5/2013 | Frenne .............. H04L 5/0094 370/329 |
| 2013/0114529 A1* | 5/2013 | Chen ................ H04L 1/1812 370/329 |
| 2013/0128832 A1 | 5/2013 | Kang et al. |
| 2013/0286990 A1 | 10/2013 | Park et al. |

FOREIGN PATENT DOCUMENTS

| | | |
|---|---|---|
| KR | 10-2011-0011524 A | 2/2011 |
| WO | 2010/060455 A1 | 6/2010 |
| WO | 2011137383 A1 | 11/2011 |
| WO | 2013/025674 A1 | 2/2013 |
| WO | 2013/044870 A1 | 4/2013 |
| WO | 2013066232 A1 | 5/2013 |

OTHER PUBLICATIONS

3rd Generation Partnership Project; Technical Specification Group Radio Access Network; Evolved Universal Terrestrial Radio Access (E-UTRA); Physical layer procedures (Release 10), Sep. 2011, 3GPP TS 36.213 V10.3.0 (Sep. 2011).*

Research in Motion, UK Limited, "PDCCH Enhancement Considerations," 3GPP TSG RAN WG1 Meeting #65, R1-111661 (May 3, 2011).

Renesas Mobile Europe Ltd., "E-PDCCH design aspects," 3GPP TSG-RAN WG1 Meeting #66bis, R1-113174 (Oct. 4, 2011).

NEC Group, "DL control channel enhancements for Rel-11," 3GPP TSG RAN WG1 Meeting #66 R1-112135 (Aug. 16, 2011).

* cited by examiner

CONTROL CHANNEL DETECTION METHOD AND APPARATUS OF MIMO SYSTEM

PRIORITY

This application is a continuation of U.S. patent application Ser. No. 13/669,945, filed on Nov. 6, 2012, which claimed the benefit under 35 U.S.C. § 119(a) of a Korean patent application filed on Nov. 7, 2011 in the Korean Intellectual Property Office and assigned Serial No. 10-2011-0115276, the entire disclosure of which is hereby incorporated by reference.

BACKGROUND OF THE INVENTION

1. Field of the Invention

The present invention relates to a Multiple Input Multiple Output (MIMO) system. More particularly, the present invention relates to a method and apparatus for detecting control channels in a MIMO system.

2. Description of the Related Art

Mobile communication systems are developed to provide subscribers with voice communication services on the move. With the rapid advance of technologies, the mobile communication systems have evolved to support high speed data communication services as well as the standard voice communication services. However, the limited resource and user requirements for higher speed services in the current mobile communication system spur the evolution to more advanced mobile communication systems.

Long Term Evolution-Advanced (LTE-A) is a next generation mobile communication standard under development to meet such user requirements. LTE-A is being standardized by the $3^{rd}$ Generation Partnership Project (3GPP). LTE-A is a technology for realizing high speed packet-based communication at up to about 1 Gbps. In an effort to achieve this, discussions are being held on several schemes such as network multiplexing for deploying multiple evolved Node Bs (eNBs) overlappingly in a specific area and increasing the number of frequency bands supported by an eNB.

Meanwhile, LTE operates with control channels designed based on a distributed transmission mode. The distributed transmission-based design aims to reduce inter-cell interference, distribute interference, and achieve frequency diversity gain.

However, LTE-A assumes there is an operating environment with very short inter-cell distance and high inter-cell interference. Accordingly, in the distributed transmission mode-based control channel design, inter-cell interference is inevitable.

LTE-A is also capable of adopting a control channel transmission mode exploiting frequency-selective gain. This is advantageous in that the control channel can be transmitted using a lesser amount of resources, but is also disadvantageous in that the terminal is likely to fail to receive the control channel, especially when the channel varies frequently. The evolved system supports both the related-art frequency diversity gain-oriented transmission mode and frequency selective gain-oriented transmission mode. The frequency-selective gain varies dynamically according to the status of the terminal. Also, there can be a control channel to which only one of the two transmission modes is employed, i.e., frequency-selective gain-oriented and frequency diversity gain-oriented transmission modes.

Accordingly, the system should support both the aforementioned transmission modes, frequency-selective gain-oriented and frequency diversity gain-oriented transmission modes, in control channel transmission without compromising terminal complexity. This means that there is a need of a control channel detection method for the terminal to acquire the configuration information on the new control channel structure.

The above information is presented as background information only to assist with an understanding of the present disclosure. No determination has been made, and no assertion is made, as to whether any of the above might be applicable as prior art with regard to the present invention.

SUMMARY OF THE INVENTION

The present invention has been made in an effort to address the above problems and it is an object of the present invention to provide a control channel detection method and apparatus that is capable of transmitting/receiving the control channels configured with different reference signals and/or in different transmission modes.

In accordance with an aspect of the present invention, a control channel transmission method of a base station is provided. The method includes acquiring a criterion for sorting control channels, sorting the control channels into at least two control channel sets based on the criterion, configuring the control channels by allocating at least one antenna port to each control channel set, and transmitting the control channels as configured. In accordance with another aspect of the present invention, a control channel reception method of a terminal includes acquiring a criterion for sorting control channels into at least two control channel sets, acquiring allocation information on at least one antenna port allocated to each control channel set sorted by the criterion, and receiving the control channels based on the criterion and allocation information.

In accordance with an aspect of the present invention, a control channel reception method of a terminal is provided. The method includes acquiring a criterion for sorting control channels into at least two control channel sets, acquiring allocation information on at least one antenna port allocated to each control channel set sorted by the criterion, and receiving the control channels based on the criterion and allocation information.

In accordance with another aspect of the present invention, a base station for transmitting control channels is provided. The base station includes a scheduler which acquires a criterion for sorting the control channels and sorts the controls channels into at least two control channel sets based on the criterion, a control channel information generator which configures the control channels by allocating at least one antenna port to each control channel set, and a transmitter which transmits the control channels as configured.

In accordance with still another aspect of the present invention, a terminal for receiving control channels is provided. The terminal includes a controller which acquires a criterion for sorting control channels into at least two control channel sets and acquires allocation information on at least one antenna port allocated to each control channel set sorted by the criterion, and a receiver which receives the control channels based on the criterion and allocation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
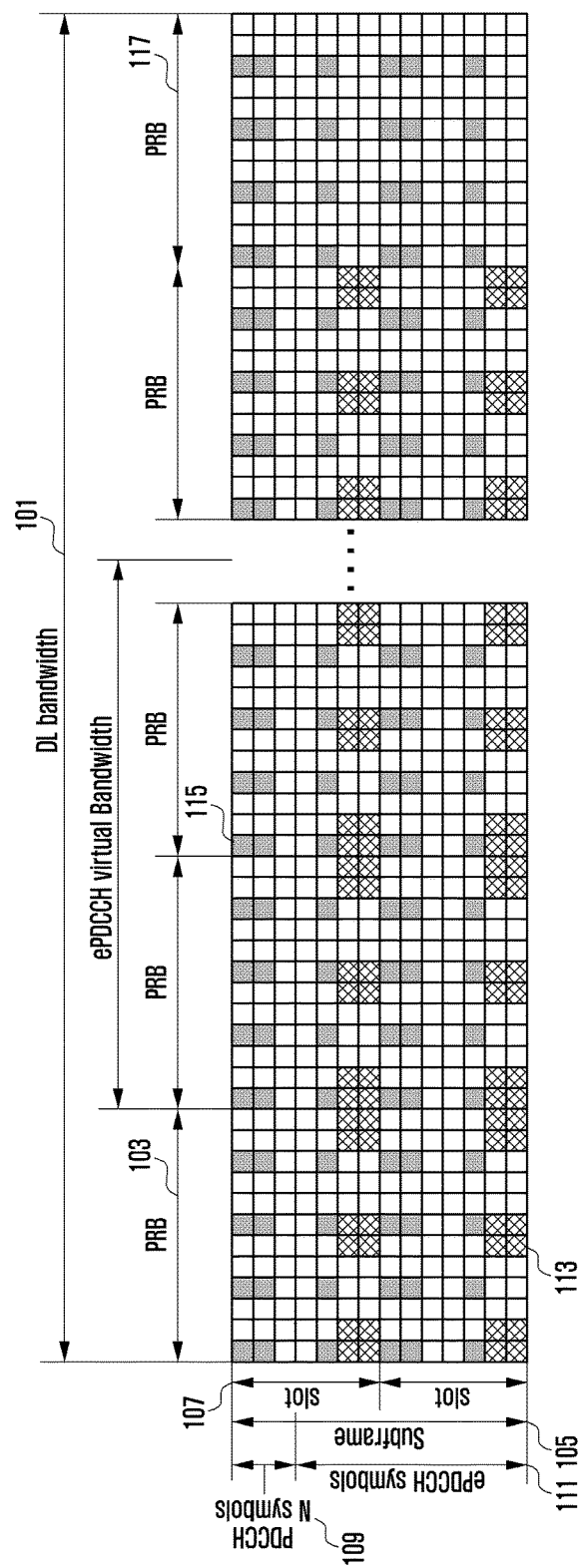
FIG. 1 is a diagram illustrating a control channel structure of a subframe for use in a Long Term Evolution (LTE) system to which exemplary embodiments of the present invention are applied.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in this description and the appended claims are not to be interpreted in common or lexical meaning but, based on the principle that an inventor can adequately define the meanings of terms to best describe the invention, to be interpreted in the meaning and concept conforming to the technical concept of the present invention.

Although the description is directed to the exemplary case of Long Term Evolution (LTE) and LTE-Advanced (LTE-A) systems, the present invention can be applied to other radio communication systems operating with base station scheduling.

Orthogonal Frequency Division Multiplexing (OFDM) is a transmission technique for transmitting data using multiple carriers, i.e., a multicarrier data transmission technique which parallelizes the serial input stream into parallel data streams and modulates the data streams onto the orthogonal multiple carriers, i.e., sub-carrier channels.

The multicarrier modulation scheme originated in the late 1950's with microwave radio for military communication purposes, and OFDM using orthogonal overlapping multiple subcarriers was developed in 1970's. However, the implementation of such systems was limited due to the difficulty of implementing orthogonal modulations between multiple carriers. With the introduction of the idea of using a Discrete Fourier Transform (DFT) for implementation of the generation and reception of OFDM signals, by Weinstein, in 1971, OFDM technology began a period of rapid development. Additionally, the introduction of a guard interval at the start of each symbol and the use of a Cyclic Prefix (CP) addresses the negative effects caused by multipath signals and delay spread.

Owing to such technical advances, the OFDM technology is applied in various digital communications fields such as Digital Audio Broadcasting (DAB), Digital Video Broadcasting (DVB), Wireless Local Area Network (WLAN), and Wireless Asynchronous Transfer Mode (WATM). That is, the implementation of OFDM could be accomplished by reducing implementation complexity with the introduction of various digital signal processing technologies such as Fast Fourier Transform (FFT) and Inverse Fast Fourier Transform (IFFT).

OFDM is similar to Frequency Division Multiplexing (FDM) but much more spectrally efficient for achieving high speed data transmission by overlapping multiple subcarriers orthogonally. Due to the spectral efficiency and robustness to the multipath fading, OFDM has been considered as a prominent solution for broadband data communication systems.

Other advantages of OFDM are to control Inter-Symbol Interference (ISI) using a guard interval and to reduce the complexity of an equalizer in view of hardware as well as spectral efficiency and robustness to the frequency selective fading and multipath fading. OFDM is also robust to impulse noise so as to be employed in various communication systems.

In wireless communications, high-speed, high-quality data services are generally hindered by the channel environment. In wireless communications, the channel environment suffers from frequent changes not only due to Additive White Gaussian Noise (AWGN), but also power variation of received signals, caused by a fading phenomenon, shadowing, a Doppler effect brought by movement of a User Equipment (UE) and a frequent change in a velocity of the UE, interference by other users or multipath signals, etc. Therefore, in order to support high-speed, high-quality data services in a wireless communication system, there is a need to efficiently address the above channel quality degradation factors.

In OFDM, modulation signals are located in two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is referred to as a Resource Element (RE). Since different REs are orthogonal with each other, signals transmitted on different REs can be received without causing interference to each other.

The physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of the information sequence or receiver. The transmitter and receiver determine REs on which a physical channel is transmitted, and this process is referred to as mapping.

The LTE system and LTE-A system evolved therefrom are the representative systems adopting OFDM in a DownLink (DL). Meanwhile, the LTE/LTE-A system adopts Single Carrier-Frequency Division Multiple Access (SC-FDMA) in UpLink (UL).

FIG. 1 is a diagram illustrating a control channel structure of a subframe for use in an LTE system to which exemplary embodiments of the present invention are applied. The subframe of FIG. 1 may be compatible in the LTE-A system.

Referring to FIG. 1, the entire downlink transmission bandwidth 101 consists of a plurality of Resource Blocks (RBs) (also referred to herein as Physical RBs (PRBs)). Each RB 103 consists of 12 frequency tones arranged in the frequency domain and 14 or 12 OFDM symbols arranged in the time domain. A RB is the basic unit of resource allocation. FIG. 1 is directed to a subframe consisting of 14 time symbols. Each subframe 105 spans 1 ms and consists of two 0.5 ms slots 107.

Reference Signals (RSs) 113 and 115 are signals agreed upon between an evolved Node B (eNB) and a User Equipment (UE) for use in channel estimation. There are two types of reference signals, i.e., a Common RS (CRS) 115 and a Dedicated RS (DRS) 113, defined for use in the LTE system. The eNB with two antennas transmits CRS through ports 0 and 1. The eNB with 4 antennas transmits the CRS 115 through ports 0, 1, 2, and 3. If there is more than one antenna port, this means that a multi-antenna system is employed.

The RSs are arranged at fixed positions of the RB in a cell-specific manner at a regular interval in the frequency domain. That is, the RSs for the same antenna port are located on every $6^{th}$ RB, and the reason why the absolute positions of the RSs are determined differently per cell is to avoid collisions between the RSs of different cells. The number of RSs differs according to the antenna port. For the antenna ports 0 and 1, a total of 8 RSs exist in a single RB or subframe, while for the antenna ports 2 and 3, a total of 4 RSs exist in a single RB or subframe. Since it has to be received by all UEs, the CRS is transmitted in all RBs across the entire downlink bandwidth.

The DRS 113 is a UE-specific reference signal transmitted in the RB where the UE is scheduled. If the RB receiving the corresponding RB 117 does not use DRS, no DRS is transmitted. The DRS 115 can also be transmitted through multiple ports like the CRS. Although it depends on the configuration, the LTE-A system may use the same resource for two antenna ports differentiated with two scrambling codes and may support up to 8 DRSs. The DRS is transmitted in the data region 103 of a specific PRB assigned to a specific UE but not across the entire downlink bandwidth 101.

Typically, the common reference signal can be used for a single antenna transmission or a Transmission Diversity (TD) transmission mode for achieving frequency or antenna diversity gain, along with a beamforming technique. Typically, the CRS is receivable by all users within the cell and thus the signals are carried in the CRS by all UEs.

In order to provide the frequency selective gain with the DRS-based transmission, a beamforming technique is used. Since the eNB performs transmission using the UE-recommended frequency resource, it is possible for the UE to receive the signal with high quality. However, there is a shortcoming in that it is vulnerable to a fast channel varying environment.

The control channel signal of LTE is arranged at the beginning of a subframe in the time domain. The control channel signal can be located in the control channel region 109 in FIG. 1. The control channel signal can be transmitted across N OFDM symbols at the beginning of the subframe. N can be 1, 2, or 3. In the case where the transmission bandwidth is narrow, n can be 2, 3, or 4. FIG. 1 is directed to the case where the control channel region of N=3. The control channel region 109 can be changed dynamically at every subframe. If one OFDM symbol is sufficient due to there being a small amount of control channel data, it is possible to allocate the first OFDM symbol for the control channel signal transmission (N=1) while the remaining 13 OFDM symbols are allocated for data channel signal transmission. If the control channel amount increases, the number of symbols available for data transmission decreases. N is used as the basic information for allocated control channel resource de-mapping and is especially used for interleaving of the control channel. The reason for placing the control channel signal at the beginning of the subframe is for early detection of the control channel such that the UE determines whether to perform a data channel reception operation depending on the presence of the data channel signal addressed to the current UE. If there is no data channel signal addressed to the UE, it is not necessary for the UE to attempt data channel decoding, thereby avoiding the power consumption caused by data channel reception. Also, by receiving the control channel at the beginning of the subframe prior to the data channel, it is possible to reduce scheduling delay.

In LTE, a Physical Dedicated Control Channel (PDCCH) is a physical channel for transmitting a common control channel and a dedicated control channel including data channel allocation information, allocation information for system information transmission or power control information. The eNB having one antenna transmits the PDCCH in a single antenna transmission mode, while the eNB having multiple antennas transmits the PDCCH in a Transmit Diversity (TD) mode.

The eNB can configure the PDCCH with different channel coding rates depending on the channel state of the UE. Since Quadrature Phase Shift Keying (QPSK) is fixedly used for PDCCH transmission, the resource amount is changed in order to change the channel coding rate. The UE with a good channel condition uses a high channel coding rate to reduce the amount of resources used for transmission. Meanwhile, the UE with a bad channel condition uses a low channel coding rate to ensure that the signal may be received despite the use of a greater amount of resources. The amount of resources for each PDCCH is determined depending on the unit of a Control Channel Element (CCE). A CCE consists of a plurality of Resource Element Groups (REGs). The REG of a PDCCH is interleaved to ensure diversity and distribute inter-cell interference and then mapped to the control channel region of PRBs across the entire downlink bandwidth as denoted by reference number 101 and 109.

The interleaving is performed to all of the REGs of the subframe that are determined by N. The output of the control channel interleaving is designed to space the REGs of the control channel allocated across one or more symbols far enough to acquire diversity gain while avoiding inter-cell interference caused by use of the same interleaver for the cells. Also, it guarantees uniform distribution of the REGs constituting the same channel across the per-channel symbols. Also, it is multiplexed with other control channels.

In the advanced environment experienced in the recent LTE-A system, however, it is assumed to deploy a large number of eNBs that are different in size within an area as compared to the related-art system. This increases interference per unit square such that the PDCCH designed for preventing inter-cell interface fails to adequately mitigate interference and is influenced more by interference from neighbor cells, resulting in a reduction of UE coverage.

Furthermore, the eNB adopting a Multi-User Multiple Input Multiple Output (MU-MIMO) technique for scheduling a greater number UEs and maximizing the system throughput lacks control channel capacity while having a sufficiently large data channel, resulting in a scheduling failure. In order to address this problem, there is a need to study the transmission of a control channel using a dedicated reference signal on the legacy data channel. In the case of transmitting the control channel on the data channel, it is possible to avoid inter-cell interference and utilize the dedicated reference signal and, as a consequence, multiple antennas can be used to transmit the control channel for multiple UEs on the same resource, resulting in a maximization of the control channel capacity. This new control channel is referred to as an enhanced PDCCH (ePDCCH) and may, for example, be found in control channel region 111 in FIG. 1.

Figure 2:
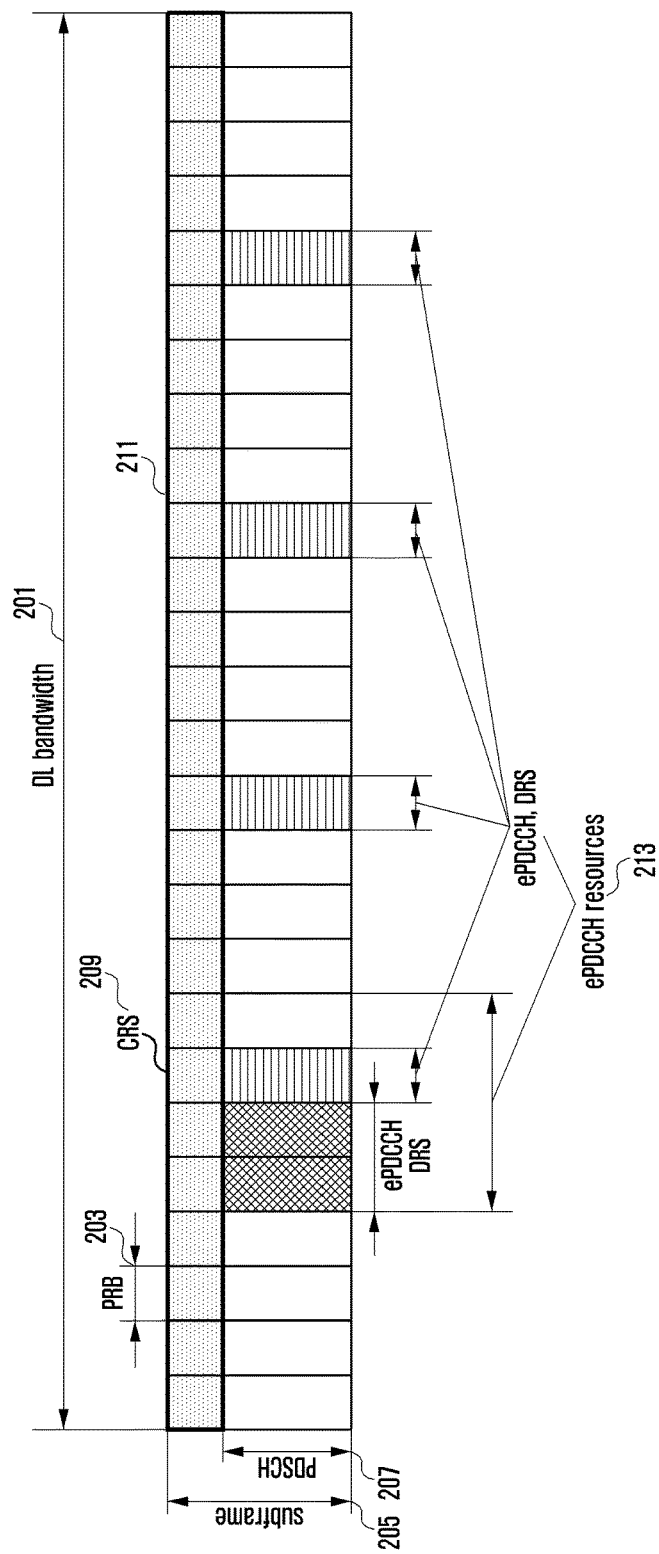
FIG. 2 is a diagram illustrating a control channel structure of an LTE-Advanced (LTE-A) system according to an exemplary embodiment of the present invention.

FIG. 2 is a diagram illustrating a control channel structure of an LTE-A system according to an exemplary embodiment of the present invention. The control channel of LTE-A includes a PDCCH transmitted with CRS 209 and an ePDCCH transmitted at locations in the data region 207. Since the ePDCCH 213 is mapped to the resources of the data region, it can be transmitted with DRS. The ePDCCH 213 is also capable of being transmitted with CRS 209, a UE group reference signal, or a sub-band reference signal. The UE group reference signal denotes the common control channel shared by a set of UEs. The sub-band reference signal is a common reference signal but is smaller in the frequency or time domain than the CRS 209. The sub-band reference signal is carried in some RBs or subframes 205.

The PDCCH is capable of being transmitted in the single antenna transmission mode and/or the TD transmission mode. The ePDCCH can be transmitted with various reference signals in at least one of the beamforming transmission mode, the single antenna transmission mode, and the TD transmission mode. The PDCCH is mapped to the regions 211 distributed across the PRBs 203 constituting the entire downlink bandwidth 201. The eNB is capable of restricting some resources to the frequency-selective region and some resources to the frequency diversity-guaranteed region such that the ePDCCH is transmitted in the region 213. The eNB is capable of changing the ePDCCH transmission mode according to the UE status, and the PDCCH reception probability also influences the reception of the ePDCCH.

The PDCCH can be classified into one of a common control channel and a dedicated control channel. The common control channel region is of a control channel to which all UEs attempt control channel demodulation. The dedicated control channel region is of the control channel to which a specific UE attempts control channel demodulation. In the LTE system, the control channel has no fixed code rate but its amount of information is determined according to the aggregation level. The common control channel is limited to aggregation levels 4 and 8, while the dedicated control channel is limited to aggregation levels 1, 2, 4, and 8. The unit of aggregation is CCE. The aggregation level 4 allows for the use of up to 4 regions, while the aggregation 8 allows for the use of up to 2 regions. Accordingly, the eNB is capable of transmitting the common control channel at up to 6 regions. The number of demodulations for the UE-specific control channel is also determined according to the aggregation level. There can be up to 6 types for aggregation levels 1 and 2 and up to 2 types for aggregation levels 4 and 8. The CCEs on which the modulation is taken are identical with each other or not according to the aggregation level. Table 1 shows the number of PDCCH candidates according to the aggregation level and control channel type.

TABLE 1

| | Search space $S_k^{(L)}$ | | |
|---|---|---|---|
| Type | Aggregation level L | Size [in CCEs] | # of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The control channel transmitted in the logical resource region between the eNB and the UE is determined according to Equation (1):

$$L \cdot \{(Y_k+m) \bmod \lfloor N_{CCE,k}/L \rfloor\}+i,$$

$$m=0,\ldots,M^{(L)}-1, i=0,\ldots,L-1 \quad (1)$$

where L denotes aggregation level, and $N_{cce,k}$ denotes a total number of CCEs existing in the $k^{th}$ subframe. With Equation (1), the UE is capable of acquiring CCE index for blink demodulation of the control channel transmitted by the eNB. $Y_k$ denotes a random variable for distributing the control channels over the entire control channel region per user to avoid collision of control channels and changes at every subframe by Equation (2). In the case of the common control channel, however, $Y_k$ is set to 0 such that all UEs can receive. $Y_k$ starts with UE ID; and A and D are 39826 and 65537 respectively.

$$Y_k=(A \cdot Y_{k-1}) \bmod D \quad (2)$$

Figure 3:
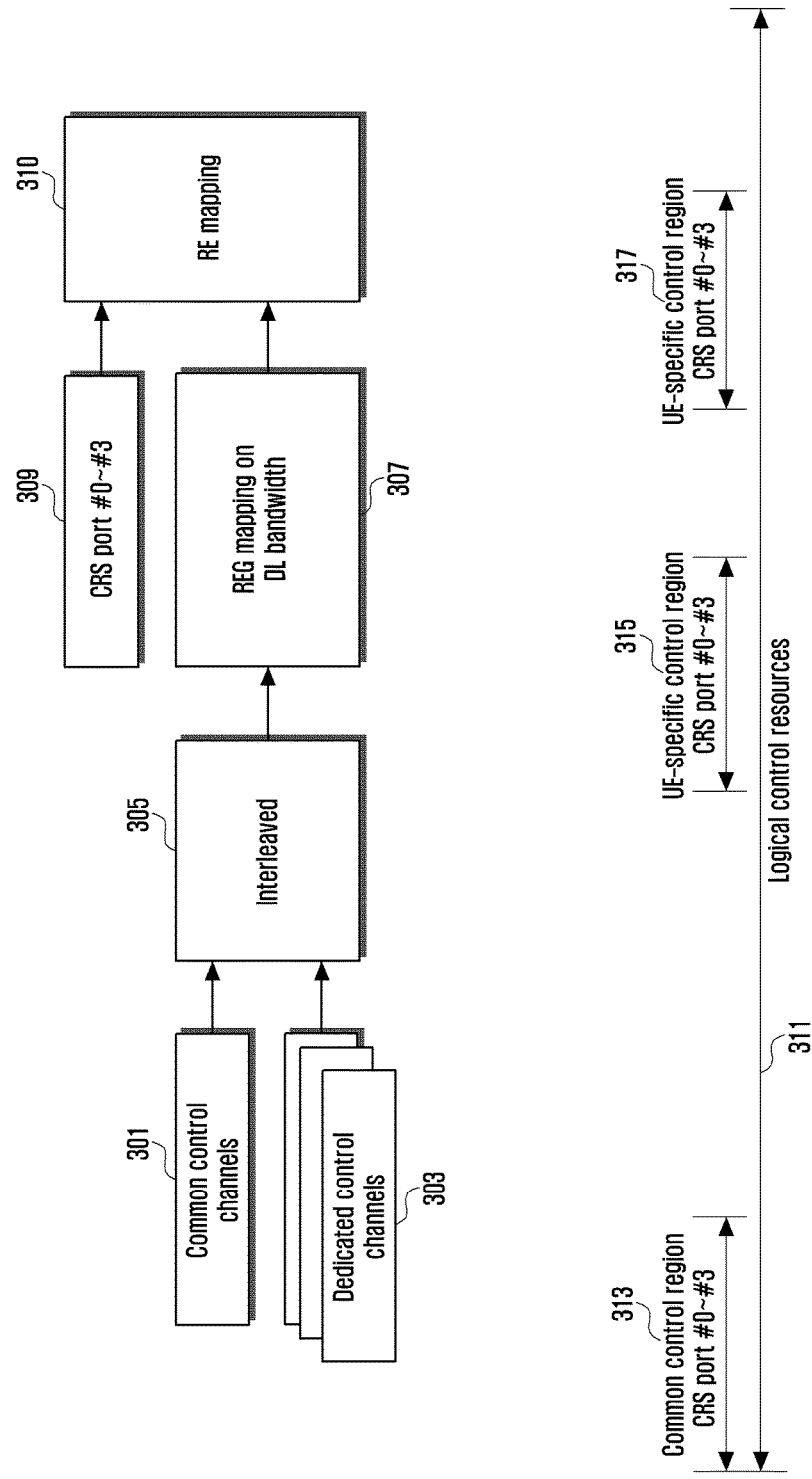
FIG. 3 is a diagram illustrating a control channel-resource mapping mechanism according to an exemplary embodiment of the present invention.

FIG. 3 is a diagram illustrating a control channel-resource mapping mechanism according to an exemplary embodiment of the present invention. The common control channel 301 and UE-specific control channel 303 are interleaved by the interleaver 305. The interleaved signal is distributed across the entire bandwidth 307 in the unit of a REG The UE, using CRS port #0~#309 maps the control channel resources into logical resources 310. The common control channel 313 is located at the beginning of the logical resource region 311 and is actually transmitted in the UE-specific transmission region among the candidates of the resource region. The UE-specific control channels 315 and 317 are transmitted in the UE-specific transmission regions of the same logical resource region. The UEs use different, overlapped, or the same logical region at every subframe. This is to avoid repeated collisions of the control channel regions of the UEs.

In the case of the PDCCH, since the UEs receive the control channels with a common reference signal, all control channels are transmitted in the region 315 or 317 in the same transmission mode and with same reference signals. In the case of ePDCCH, however, the control channels can be transmitted in different transmission modes and with different resources, there is a need for configuring respective transmission modes and determining respective search spaces. A search space configuration method is proposed hereinafter.

Figure 4:
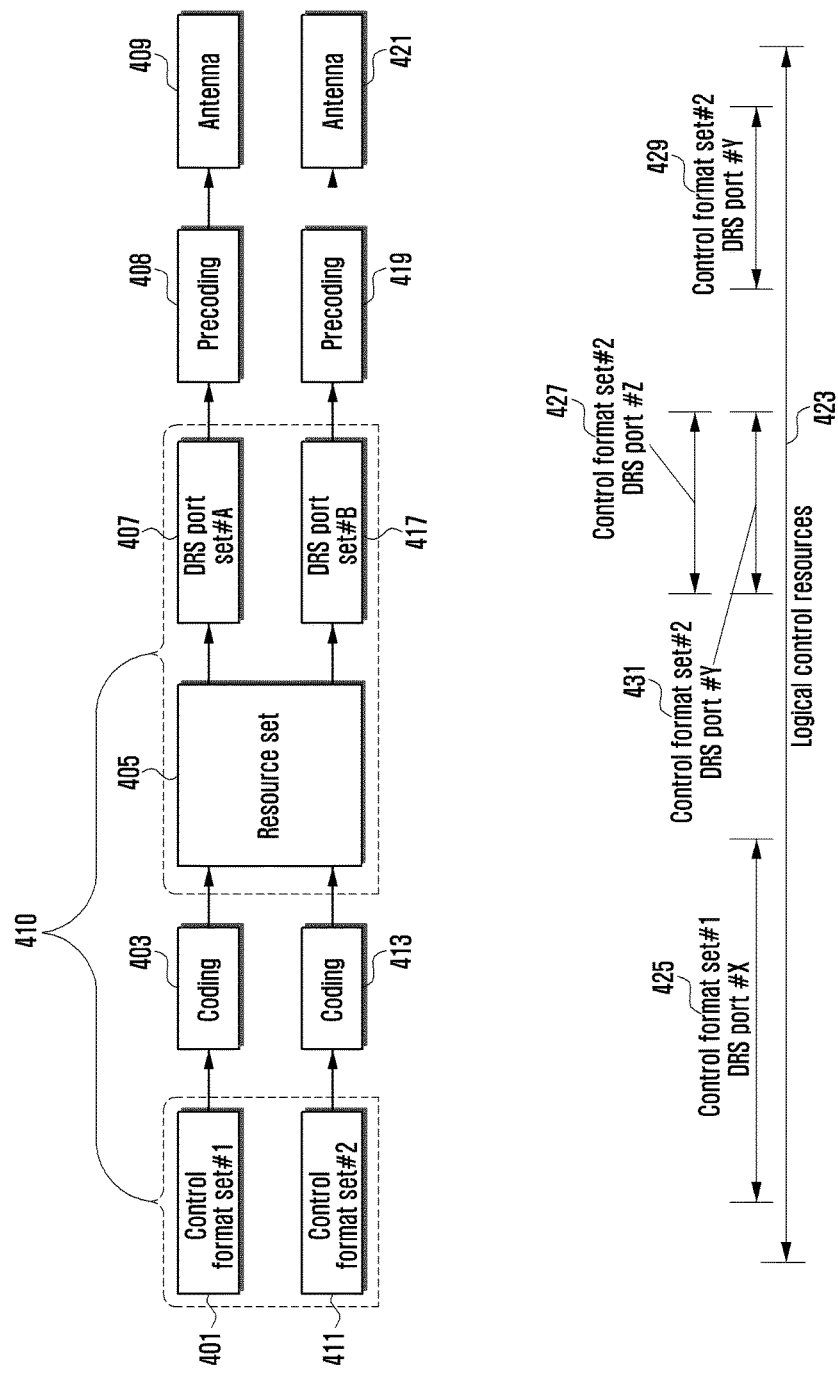
FIG. 4 is a diagram illustrating a mechanism of a control channel transmission according to a first exemplary embodiment of the present invention.

FIG. 4 is a diagram illustrating a mechanism of a control channel transmission according to a first exemplary embodiment of the present invention. According to the first exemplary embodiment of the present invention, the eNB sorts the control channels mapped to a control channel resource into sets by control channel format or type and transmits the sets of different formats or types with different reference signals or different reference signals ports. The terminal receives the control channels of the sets of different formats or types in the search regions for the different reference signals or reference signal ports.

The control channel groups 401 and 411 sorted by control channel format or control channel property are depicted. The eNB is capable of sorting the control channels into groups by format. For example, the eNB is capable of sorting the control channels into 3/3A, 1A, 1C, and other format groups. The eNB is also capable of sorting the control channels into a group of control channels for multiple UEs and a group of control channels for a single UE. The control channels also can be sorted into a group of control channels transmitted with a UE's unique Radio Network Temporary Identifier (RNTI) and a group of control channels transmitted with the RNTI for system information, paging, initial access, and power control. The eNB may notify the UE of the identifiers of the control channel groups through higher layer signaling. According to a modified exemplary embodiment, the control channel group identifiers can be stored in the memories of the UE and the eNB according to a predetermined rule.

The control channel groups are encoded by the respective encoders 403 and 413. The eNB arranges the control channels in a resource group 405 signaled by the eNB. The eNB notifies the UE of the information on the reference signals used in the respective control channel groups. For example, the reference signal information 407 is used for transmitting the control channel group 401, and the reference signal information 417 is used for transmitting the control channel group 411. The control channel groups can be transmitted via respective antennas 409 and 421 in different transmission modes. Depending on the properties of the control channel groups, one control channel group can transmitted in a TD mode, while the other control channel group in a beamforming mode. Here, the control channel groups 401 and 411, the resource group 405, and the reference signal information 407 and 417, is collectively denoted as 410.

For another example, one control channel group can be transmitted via antenna 409 as precoded by the precoder 408, while the other control channel group can be transmitted via antenna 421 as precoded by the precoder 419. Although both the control channel groups are processed in the same transmission mode, they may be transmitted with different precodings. It is also possible for a control channel group to be allocated one reference signal or multiple reference signals. In the TD transmission mode, if two or more reference signal groups are allocated to the control channel group and beamforming is used, one or two reference signal groups are allocated for the control channel group. The reference signal information 407 and 417 can be notified through higher layer signaling and, according to a modified exemplary embodiment, the UE is capable of performing blind demodulation on the reference signal information 407 and 417. In the blind demodulation, the terminal attempts demodulation with the assumption of all available combinations of the transmission modes and reference signals until the control channel is received successfully.

The UE receives the control channel resource region information transmitted by the eNB through higher layer signaling and reconfigures the control channels into logical control channel region 423. The terminal configures two search spaces based on the information of the two control channel groups and the reference signals for use in receiving the control channel groups. The first search space is the search space 425 for the first control channel group in which the UE searches for the control signal using the reference signal group 407. The second search space is for second control channel group in which the UE searches for the control signal using the second reference signal group 417.

If the first control channel group is of controls channels for multiple UEs, the UEs receive the control channels using the same reference signal. The UEs receive the control channels 411 using different reference signals in the different control channel search spaces 431, 427, and 429. In the case where the same resource is allocated to the UEs as denoted by reference number 431 and 427, the control channels can be transmitted with different reference signals. In the case where the different resources are allocated to the UEs as denoted by reference number 431 and 429, the control channel can be transmitted with the same reference signal. In this way, the eNB is capable of transmitting the control channels in different transmission modes according to the UE status and type of the control channels. If the number of UEs which has to receive the current control channel decreases to 1, the eNB is capable of changing the transmission mode dynamically for the UE to receive the control channel efficiently.

A description is made of the search space of the UE according to the first exemplary embodiment with reference to Equations (1) and (2). The UE is capable of acquiring a CCE index for blind demodulation of the control channel transmitted by the eNB using Equation (3). $Y_k$ denotes a random variable for distributing the control channels regularly across the entire control channel region by user in order to avoid collision. $Y_k$ varies at every subframe according to Equation (2). The search space for the first control channel group can be expressed as Equation (3):

$$L \cdot \{(Y_k+m) \bmod \lfloor N_{CCE,k}/L \rfloor\}+i,$$

$$m=0,\ldots,M^{(L)}-1, i=0,\ldots,L-1$$

for common control channel with antenna port set
1 and $Y_k=(A \cdot Y_{k-1}) \bmod D$ \hfill (3)

where $Y_k$ denotes a common UE IDentifier (ID); and A and D are 39827 and 65537, respectively.

The search space for the second control channel group can be expressed as Equation (4):

$$L \cdot \{(Y_k+m) \bmod \lfloor N_{CCE,k}/L \rfloor\}+i,$$

$$m=0,\ldots,M^{(L)}-1, i=0,\ldots,L-1$$

for UE specific control channel with antenna port set
2 and $Y_k=(A \cdot Y_{k-1}) \bmod D$ \hfill (4)

where $Y_k$ starts with the dedicated UE identifier (ID); and A and D are 39827 and 65537, respectively.

According to Equations (3) and (4), the search spaces are determined with different values of $Y_k$. The first group is determined with the UE group identifier, and the second group is determined with a unique UE identifier. That is, the control channel region for multiple UEs configured at the same location but varies continuously at every subframe. The UE-specific control channels for the respective UEs are transmitted at random positions. In this way, it is possible to avoid repeated collisions.

Figure 5:
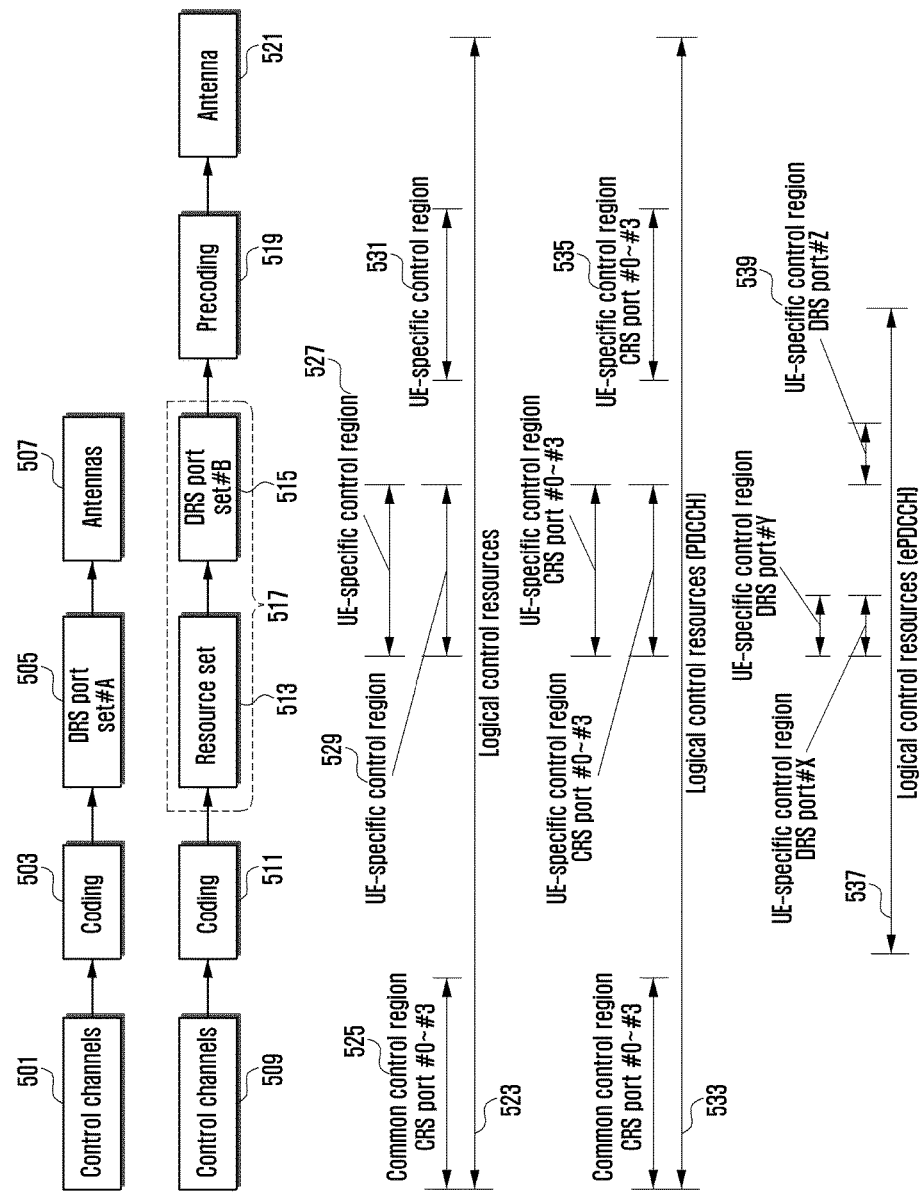
FIG. 5 is a diagram illustrating a mechanism of a control channel detection according to a second exemplary embodiment of the present invention.

FIG. 5 is a diagram illustrating a mechanism of control channel detection according to a second exemplary embodiment of the present invention. Referring to FIG. 5, the eNB according to the second exemplary embodiment of the present invention configures different control channel transmission resources and maps the logical control channel resources thereto respectively using the same search space. The eNB transmits the control channels mapped to the resources using different reference signals or different reference signal ports. The terminal receives the control channels mapped to the different control channel regions in the same search space using the different reference signals or different reference signal ports.

The second exemplary embodiment of the present invention can be applied to the UE which is capable of receiving both the legacy control channel and the newly introduced control channel. The legacy control channel 501 transmitted in the control channel region and the new control channel 509 transmitted in the new control channel region are depicted in the FIG. 5. The control channels 501 and 509 are coded by the respective encoders 503 and 511. The control channel 501 is transmitted via antenna 507 using the reference signal or reference signal group 505 that has been indicated to the UE. Here, the control channel 501 may be transmitted with CRS generated by a CRS generator. The eNB transmits the control channel 509 in the new control channel region 513 notified to the UE in advance through higher layer signaling. The eNB transmits the control channel 509 via antenna 521 using the reference signal or reference signal group 515 that has been indicated to the UE. Herein, the new control channel region 513 and the reference signal or reference signal group 515 are collectively denoted as 517. In another example, the eNB transmits the control channel 509 via antenna 521 as precoded by the precoder 419.

Such a control channel structure is designed to transmit the control channel in the legacy control channel region and the new control channel region dynamically. The eNB is capable of transmitting the control channels in the legacy control channel region in the case where the channel condition of the UE is bad or in the new control channel region in the case where the channel condition is good. This method is advantageous in that the eNB is capable of changing the transmission region of the control channel without extra signaling. Also, this method is advantageous in that the UE is capable of receiving the control channel by applying the same search space to different resources without additional search space configuration. That is, the method of the second exemplary embodiment allows the UE to receive the control channels mapped to the different resources in the same search space with different reference signals.

If the eNB transmits the control channels, the UE configures the logical control channel resource 523. The common control channel is received in the common control region 525. Each UE determines UE-specific control channel regions 529, 527, and 531 using Equation (1) for search space determination. Afterward, the UE maps the control channel region 533 for PDCCH transmission to the logical control channel region 535 to receive the common control channel and UE-specific control channel with CRS. At the same time, the UE maps the resource region 537 for ePDCCH transmission to the logical control channel region to receive the ePDCCH in the UE-specific control channel region 539. The UE receives the ePDCCH using the pre-notified reference signal group 515. In the case of ePDCCH, the resource 533 to which it is actually mapped may have a different resource value. In contrast, the resource 533 to which the PDCCH is mapped has the same resource value. The control channel search space for the first control channel group can be expressed by Equation (5):

$$L \cdot \{(Y_k+m) \bmod \lfloor N_{CCE,k(PDCCH)}/L \rfloor \}+i,$$

$$m=0, \ldots, M_{PDCCH}^{(L)}-1, i=0, \ldots, L-1$$

for dedicated control with CRS and $Y_k=(A \cdot Y_{k-1}) \bmod D$ \hfill (5)

where $Y_k$ starts with the common UE identifier; and A and D are 39827 and 65537, respectively.

The search space for the second control channel group can be expressed by Equation (6):

$$L \cdot \{(Y_k+m) \bmod \lfloor N_{CCE,k(ePDCCH)}/L \rfloor \}+i,$$

$$m=0, \ldots, M_{ePDCCH}^{(L)}-1, i=0, \ldots, L-1$$

for dedicated control with configured DRS antenna port and $Y_k=(A \cdot Y_{k-1}) \bmod D$ \hfill (6)

where $Y_k$ starts with the common UE identifier; and A and D are 39827 and 65537, respectively. $M_{PDCCH}^{(L)}$ and $M_{ePDCCH}^{(L)}$ denote the numbers of PDCCH and ePDCCH search times, respectively. These parameters can be informed through higher layer signaling. According to a modified exemplary embodiment, the numbers of search times for the PDCCH and the ePDCCH can be stored in the memories of the UE and the eNB in advance.

Figure 6:
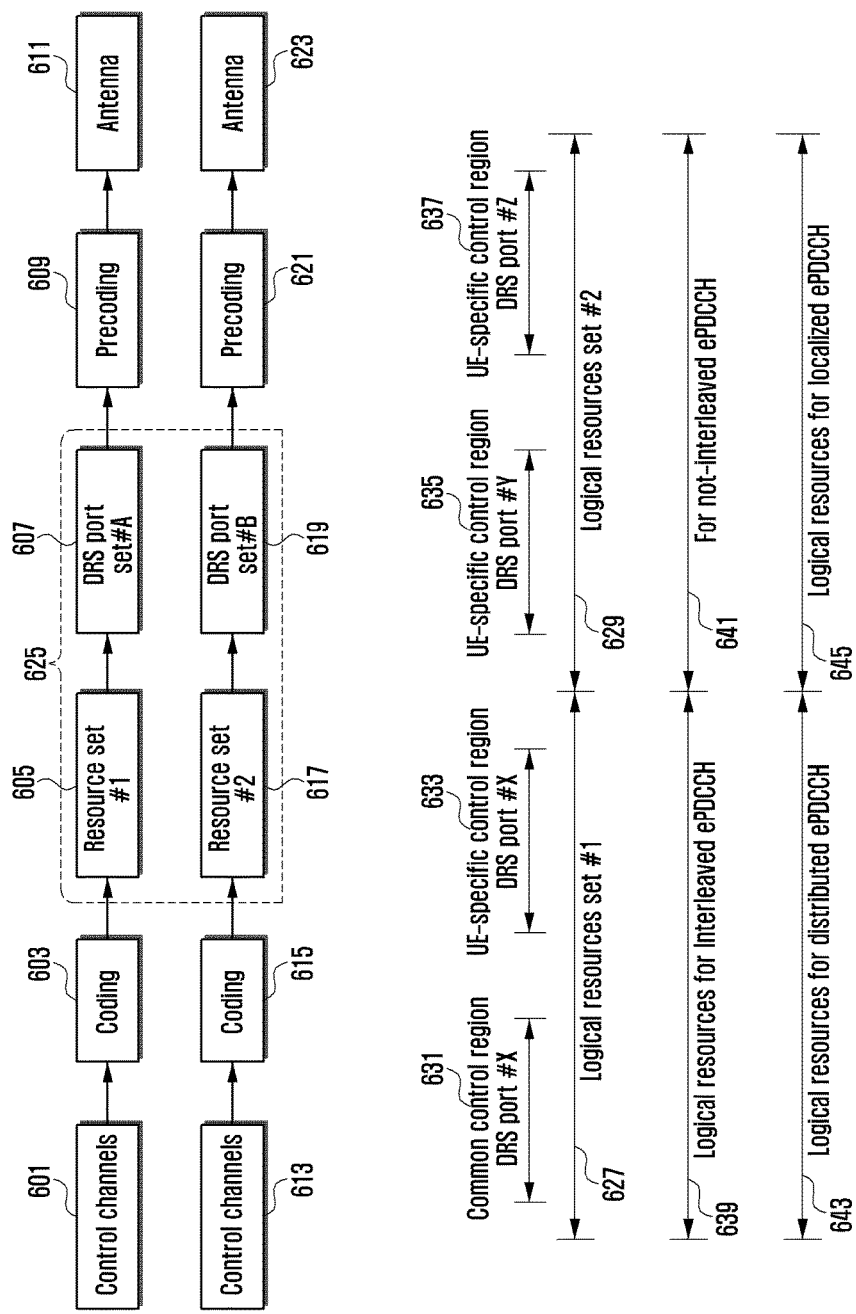
FIG. 6 is a diagram illustrating a mechanism of a control channel detection according to a third exemplary embodiment of the present invention.

FIG. 6 is a diagram illustrating a mechanism of a control channel detection according to a third exemplary embodiment of the present invention. The eNB according to the third exemplary embodiment of the present invention configures a plurality of control channel transmission resources and notifies the UE of reference signals or reference signal groups for use in association with the respective resources. The UE configures the plural control channel transmission regions into the search spaces based on the reference signals or reference signal groups informed by the eNB. The UE receives the control channels based on the reference signals or the reference signal groups mapped to the resources.

The control channels can be sorted into two groups 601 and 613. The two control channel groups 601 and 613 are the groups of certain control channels and are coded by the respective encoders 603 and 615. The eNB is capable of configuring such that the control channels are selectively transmitted via antennas 611 and 623 in the two control channel groups using the reference signals or reference signal groups 607 and 619. The eNB notifies the UE of the reference signals or reference signal groups 607 and 619 used in resource regions commonly and independently. The resource region 605 for transmitting one control channel group and the reference signal therefor and the resource region 617 for transmitting another control channel group and reference signal therefor are depicted in the drawing. Here, resource regions 605 and 617, and reference signals or reference signal groups 607 and 619, are collectively denoted as 625. In another example, the two control channel groups 601 and 613 may be transmitted via antennas 611 and 623 as precoded by precoders 609 and 621.

The two resources 627 and 629 are the resources determined according to the resource configuration method or transmission method. For example, one resource can be the resource 639 for transmitting the interleaved control channels while the other resource can be the resource 641 for transmitting the non-interleaved control channels. According to another exemplary embodiment of the present invention, one resource can be the control channel region 643 for the distributed transmission mode, while the other resource can be the control channel region 645 for the localized transmission mode. The eNB can configure the resource regions such that the UE is capable of receiving the control channels efficiently with or without application of the multiple antenna transmission mode.

According to the third exemplary embodiment of the present invention, two resources can be configured into a distributed transmission resource or an interleaving transmission resource and a localized transmission resource or a non-interleaving transmission resource. The two resources can be configured independently or in an overlapped manner. In the case where the control channels are transmitted on the two resources, the eNB performs transmission with different reference signals for the two resources. The UE is capable of receiving the control channels with different reference signals for the respective resources. Using the resources configured with different reference signals, the eNB is capable of configuring different transmission modes for the respective resource regions. The eNB is capable of transmitting the control channels to achieve at least one of frequency diversity gain and antenna diversity gain according to the channel condition of the UE. In this manner, the eNB is capable of supporting both the resource configuration and multi-antenna transmission mode simultaneously and switching among the transmission resources and among the transmission modes dynamically.

Typically, the distributed transmission region or the interleaving transmission region can be used for transmitting the common control channel 631 or the UE-specific control channel 633 for the UE operating in a TD transmission mode. In contrast, the localized transmission region or the non-interleaving transmission region can be used for transmitting the dedicated reference signals 635 and 637 in the beamforming mode. However, the transmission method can be changed depending on the number of UEs, eNB status, and UE status. The search space for the first control channel group can be expressed by Equation (7):

$$L \cdot \{(Y_k+m) \bmod \lfloor N_{CCE,k(Localized)}/L \rfloor\} + i,$$

$$m=0, \ldots, M_{Localized}^{(L)}-1, i=0, \ldots, L-1$$

$$\text{with DRS port set 1 and } Y_k=(A \cdot Y_{k-1}) \bmod D \quad (7)$$

where $Y_k$ starts with the dedicated UE ID; and A and D are 39827 and 65537, respectively.

The search space for the second control channel group can be expressed by Equation (8):

$$L \cdot \{(Y_k+m) \bmod \lfloor N_{CCE,k(distributed)}/L \rfloor\} + i,$$

$$m=0, \ldots, M_{distributed}^{(L)}-1, i=0, \ldots, L-1$$

$$\text{with DRS port set 2 and } Y_k=(A \cdot Y_{k-1}) \bmod D \quad (8)$$

Figure 7:
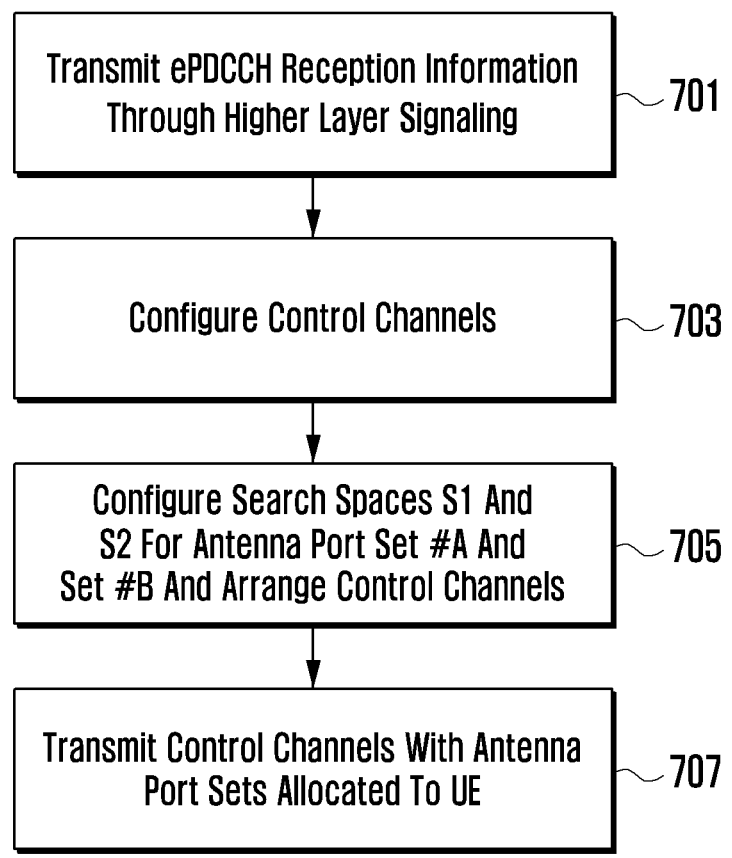
FIG. 7 is a flowchart illustrating a control channel transmission method of an evolved Node B (eNB) according to an exemplary embodiment of the present invention.

FIG. 7 is a flowchart illustrating a control channel transmission method of the eNB according to an exemplary embodiment of the present invention.

Referring to FIG. 7, the eNB transmits the configuration information of ePDCCH through higher layer signaling at step 701. This information includes at least one resource information and at least one reference signal information for ePDCCH transmission as proposed in the present disclosure. The eNB configures the control channels of PDCCH and ePDCCH at step 703. Next, the eNB configures the search spaces as the control channel transmission regions for the control channel groups transmitted with multiple antenna port sets and arranges the control channels in the search regions so as to avoid collision between UE-specific control channels at step 705. The eNB transmits the control channels with the respective reference signals in order for the UEs to receive the control channels addressed thereto at step 707.

Figure 8:
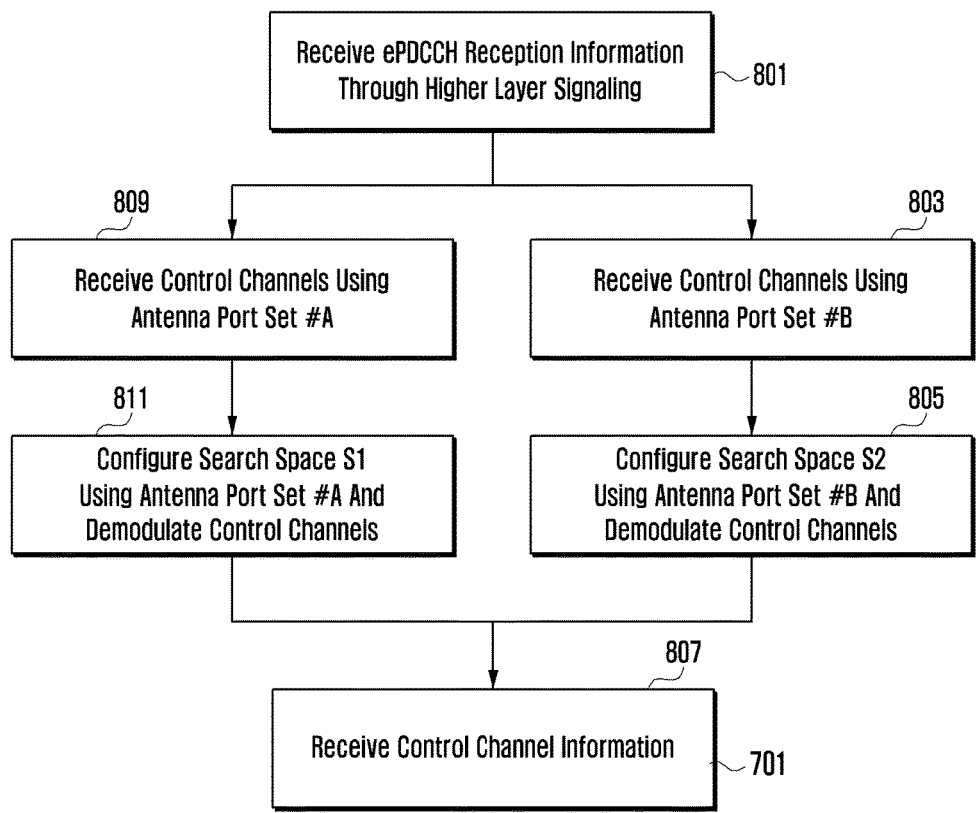
FIG. 8 is a flowchart illustrating a control channel reception method of a User Equipment (UE) according to an exemplary embodiment of present invention.

FIG. 8 is a flowchart illustrating a control channel reception method of a UE according to an exemplary embodiment of present invention. Referring to FIG. 8, the UE receives the information about ePDCCH through higher layer signals at step 801. This information may include the control channel region information and at least one reference signal information for receiving on the respective resources. The UE estimates the channels based on the reference signals and receives the information on the control channel region in the data region based on the respective reference signals at steps 809 and 803. The UE configures the search spaces in the data region determined with the reference signal at steps 811 and 805. The UE demodulates the control channel of one control channel resource region at step 811 and another control channel resource region at step 805. The UE receives the control channel information using the demodulated control channel at step 807.

Figure 9:
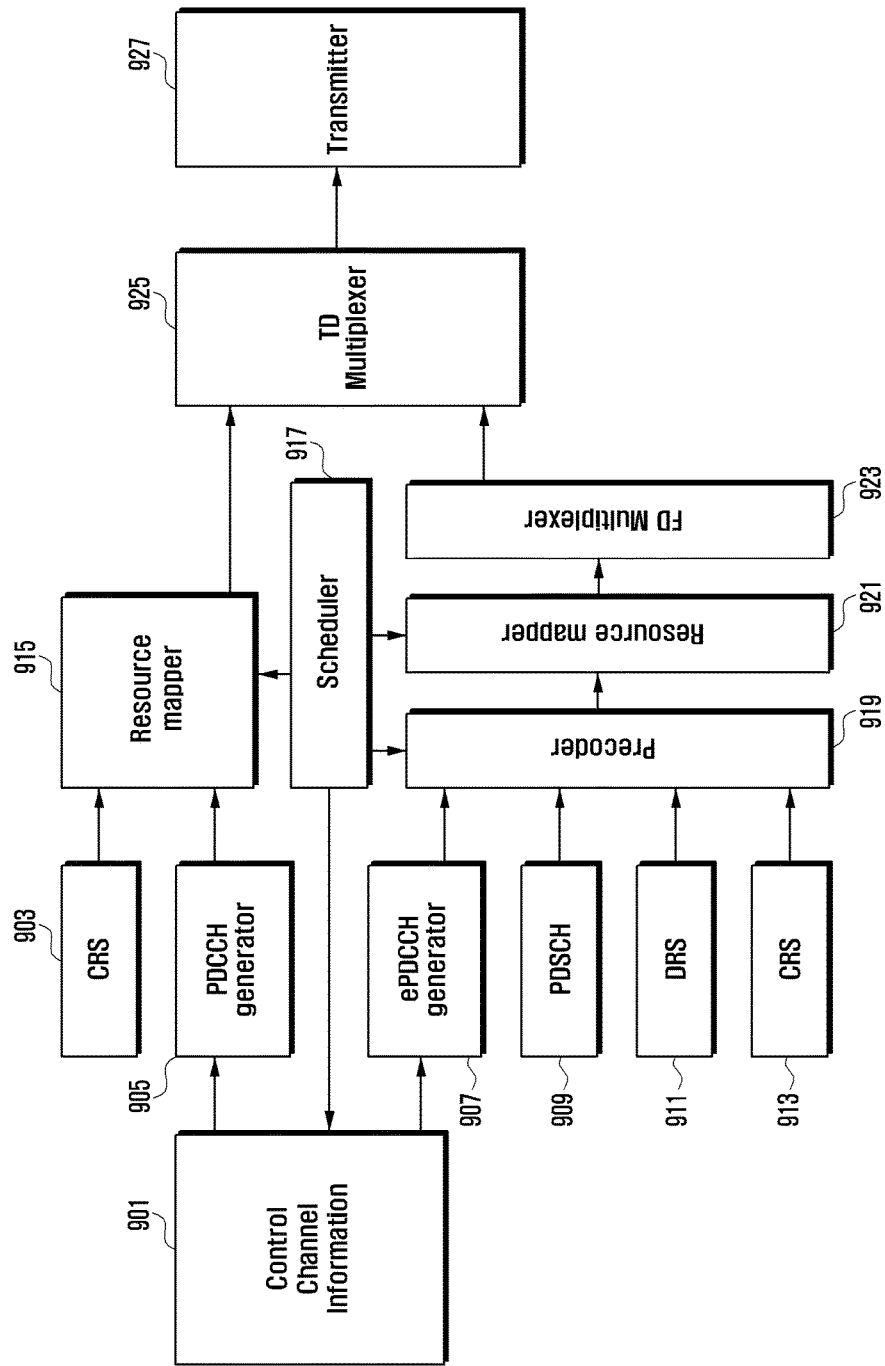
FIG. 9 is a block diagram illustrating a configuration of a control channel transmission apparatus of an eNB according to an exemplary embodiment of the present invention.

FIG. 9 is a block diagram illustrating a configuration of a control channel transmission apparatus of an eNB according to an exemplary embodiment of the present invention.

Referring to FIG. 9, the scheduler 917 controls the PDCCH generator 905 and the ePDCCH generator 907 to configure the control channels based on the control channel information 901. The precoder 919 performs precoding on the ePDCCH, PDSCH 909, DRS 911, and CRS 913 according to the transmission mode. The resource mapper 921 maps the control channels to the reference signals using the precoded signal. The Frequency Domain (FD) multiplexer 923 multiplexes the data channel and ePDCCH according to the scheduling information of the scheduler 917. The resource mapper 915 maps the PDCCH and CRS 903 to the resource. The Time Domain (TD) multiplexer 925 multiplexes the multiplexed ePDCCH and PDSCH signal with multiplexed PDCCH signal in the time domain. The transmitter 927 transmits the time domain-multiplexed signal to the UE.

Figure 10:
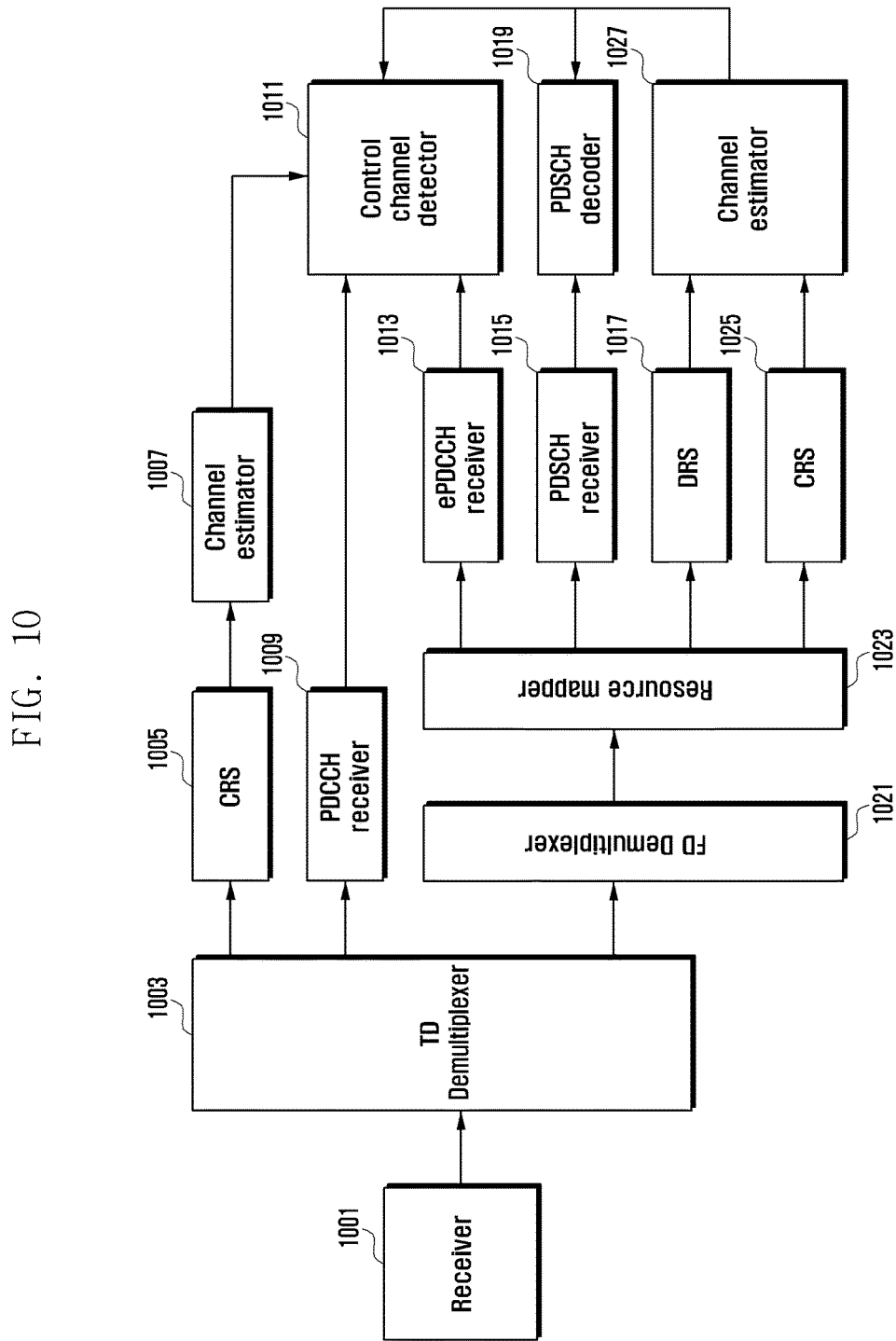
FIG. 10 is a block diagram illustrating a control signal reception apparatus of a UE according to an exemplary embodiment of the present invention.

FIG. 10 is a block diagram illustrating a control signal reception apparatus of a UE according to an exemplary embodiment of the present invention.

Referring to FIG. 10, the receiver 1001 receives a signal. The TD demultiplexer 1003 demultiplexes the received signal into PDCCH transmission region and PDSCH transmission region. The channel estimator 1007 estimates channels using the CRS 1005 in the PDCCH transmission region. The PDCCH receiver 1009 receives PDCCH, and the control channel detector 1011 detects the received PDCCH. The FD demultiplexer 1021 demultiplexes the PDCCH region. The resource de-mapper 1023 delivers the PDSCH to the PDSCH receiver 1015, the ePDCCH to the ePDCCH receiver 1013, and CRS 1025 and DRS 1017 to the channel estimator 1027. The channel estimator 1027 estimates channels. The PDSCH decoder 1019 and the control channel detector 1011 receive the control channel using the estimated control channel information.

According to an exemplary embodiment of the present invention, the eNB is capable of transmitting to the UE the control channels using multiple different reference signals with various transmission modes in order to achieve frequency selective gain or frequency diversity gain depending on the channel conditions experienced by the UE. The UE is capable of configuring the search spaces for receiving the control channels according to the type of reference signal and/or allocated resource and receiving the control channels based on the channel estimation information. The UE is capable of receiving the control channels transmitted in various transmission modes simultaneously without extra signaling. The eNB is capable of transmitting the control channels with different reference signals or in different transmission modes according to the types of the control channels.

As described above, the control channel detection method and apparatus of the exemplary embodiments of the present invention are advantageous to transmit/receive control channels efficiently with different reference signals or in different transmission modes.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "module" according to the exemplary embodiments of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the exemplary embodiments of the present invention and is not intended to be limiting. Since modifications of the disclosed embodiments incorporating the spirit and substance of the invention may occur to persons skilled in the art, the invention should be construed to include everything within the scope of the appended claims and equivalents thereof.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for a wireless communication system, the method comprising:
    receiving resource information indicating a resource for an enhanced physical downlink control channel (EPDCCH);
    identifying a set of antenna ports of a reference signal for the resource based on a transmission mode applied to the resource;
    identifying an antenna port of the reference signal for the resource among the set of antenna ports of the reference signal based on an identifier of a terminal; and
    receiving downlink control information on the EPDCCH using the antenna port of the reference signal.

2. The method of claim 1, wherein the resource is for a localized transmission mode.

3. The method of claim 2, wherein the resource information is received via higher layer signaling.

4. The method of claim 1, wherein the reference signal is a dedicated reference signal.

5. A method for a wireless communication system, the method comprising:
    transmitting resource information indicating a resource for an enhanced physical downlink control channel (EPDCCH); and
    transmitting downlink control information on the EPDCCH located on the resource using an antenna port of a reference signal,
    wherein a set of antenna ports of the reference signal for the resource is identified based on a transmission mode applied to the resource, and the antenna port of the reference signal is identified among the set of antenna ports of the reference signal based on an identifier of a terminal.

6. The method of claim 5, wherein the resource is for a localized transmission mode.

7. The method of claim 5, wherein the resource information is transmitted via higher layer signaling.

8. The method of claim 5, wherein the reference signal is a dedicated reference signal.

9. A terminal for a wireless communication system, the terminal comprising:
- a receiver configured to receive signals from a base station; and
- at least one processor configured to:
  - control the receiver to receive resource information indicating a resource for an enhanced physical downlink control channel (EPDCCH),
  - control to identify a set of antenna ports of a reference signal for the resource based on a transmission mode applied to the resource,
  - control to identify an antenna port of the reference signal for the resource among the set of antenna ports of the reference signal based on an identifier of the terminal, and
  - control the receiver to receive downlink control information on the EPDCCH using the antenna port of the reference signal.

10. The terminal of claim 9, wherein the resource is for a localized transmission mode.

11. The terminal of claim 9, wherein the resource information is received via higher layer signaling.

12. The terminal of claim 9, wherein the reference signal is a dedicated reference signal.

13. A base station for a wireless communication system, the base station comprising:
- a transmitter configured to transmit signals to a terminal; and
- at least one processor configured to control the transmitter to:
  - transmit resource information indicating a resource for an enhanced physical downlink control channel (EPDCCH), and
  - transmit downlink control information on the EPDCCH located on the resource using an antenna port of a reference signal,
- wherein a set of antenna ports of the reference signal for the resource is identified based on a transmission mode applied to the resource, and the antenna port of the reference signal is identified among the set of antenna ports of the reference signal based on an identifier of the terminal.

14. The base station of claim 13, wherein the resource is for a localized transmission mode.

15. The base station of claim 13, wherein the resource information is transmitted via higher layer signaling.

16. The base station of claim 13, wherein the reference signal is a dedicated reference signal.

* * * * *